(12) United States Patent
Yu

(10) Patent No.: US 8,181,512 B2
(45) Date of Patent: May 22, 2012

(54) TIMING DEVICE HAVING A FLOW CONTROL FUNCTION

(76) Inventor: Ching-Chih Yu, Lugang Township, Changhua County (TW)

( * ) Notice: Subject to any disclaimer, the term of this patent is extended or adjusted under 35 U.S.C. 154(b) by 216 days.

(21) Appl. No.: 12/726,495

(22) Filed: Mar. 18, 2010

(65) Prior Publication Data

US 2011/0226363 A1 Sep. 22, 2011

(51) Int. Cl.
*G01F 15/00* (2006.01)
*G01F 1/56* (2006.01)
(52) U.S. Cl. .................... 73/198; 73/861.77; 137/624.11
(58) Field of Classification Search ............. 137/624.11, 137/624.12; 239/68, 70; 73/861.77, 861.79, 73/198
See application file for complete search history.

(56) References Cited

U.S. PATENT DOCUMENTS

| 5,715,866 A * | 2/1998 | Granger | 137/624.11 |
| 5,782,263 A * | 7/1998 | Isaacson et al. | 137/487.5 |
| 6,719,010 B1 * | 4/2004 | Yi-Chang | 137/624.11 |
| 6,837,271 B1 * | 1/2005 | Saint | 137/624.12 |

* cited by examiner

*Primary Examiner* — Kevin Lee
(74) *Attorney, Agent, or Firm* — Che-Yang Chen; Law Office of Michael Chen

(57) ABSTRACT

A timing device includes a timer and a flow meter mounted on the timer. The timer has a water inlet port and a water outlet port. The flow meter includes a first guide pipe mounted on the water outlet port and provided with a mounting chamber, a detector mounted on the first guide pipe, a rotation ring rotatably mounted in the mounting chamber, a magnetic member mounted on the rotation ring and movable to pass the detector, and a second guide pipe mounted on the first guide pipe. Thus, the water flow rate in the flow meter is calculated according to the times of the magnetic member passing the detector so that when the flow rate of the water passing through the flow meter reaches a preset value, the timer stops operating so as to control the water flow exactly.

3 Claims, 4 Drawing Sheets

TIMING DEVICE HAVING A FLOW CONTROL FUNCTION

BACKGROUND OF THE INVENTION

1. Field of the Invention

The present invention relates to a timing device and, more particularly, to a timing device for a water pipe that is used in a gardening tool.

2. Description of the Related Art

A conventional timer is mounted on a water pipe that is used in a gardening tool, such as a sprinkler and the like. The conventional timer has a preset on/off time ratio so that when the preset on time is reached, the timer is operated to allow passage of the water to provide a sprinkling or irrigating function, and when the preset off time is reached, the timer stops operating to stop the water flow. However, the conventional timer cannot detect the flow rate of the water passing through the pipe so that the water flowing through the pipe is easily supplied excessively or insufficiently during the preset time.

BRIEF SUMMARY OF THE INVENTION

In accordance with the present invention, there is provided a timing device, comprising a timer and a flow meter mounted on the timer. The timer is an electrically controlled flow switch and has a preset on/off time ratio. The timer has a first end provided with a water inlet port and a second end provided with a water outlet port connected to the water inlet port. The second end of the timer has a surface provided with a through hole located beside the water outlet port. The flow meter includes a first guide pipe having a first end mounted on the water outlet port of the timer and a second end provided with a mounting chamber connected to the water outlet port of the timer, a magnetically controlled detector mounted on an outer wall of the first guide pipe, two electric cords electrically connected with the detector and extended through the through hole of the timer into the timer to electrically connect the detector to the timer, a rotation ring rotatably mounted in the mounting chamber of the first guide pipe and aligning with the detector, a magnetic member mounted on a peripheral wall of the rotation ring to move in concert with the rotation ring and movable to pass the detector intermittently, and a second guide pipe mounted on the second end of the first guide pipe and connected to the mounting chamber of the first guide pipe. The outer wall of the first guide pipe of the flow meter is provided with a fixing recess, and the detector is secured in the fixing recess of the first guide pipe. The rotation ring of the flow meter is sandwiched and connected between the first guide pipe and the second guide pipe. Thus, the flow rate of water in the flow meter is calculated according to the times of the magnetic member passing the detector so that when the flow rate of the water passing through the flow meter reaches a preset value, the timer stops operating so as to control the water flow exactly.

The flow meter further includes an O-ring mounted in the mounting chamber of the first guide pipe and located between the first guide pipe and the second guide pipe.

The primary objective of the present invention is to provide a timing device having a flow control function to control the flow rate of a water pipe that is used in a gardening tool.

According to the primary objective of the present invention, the timer can calculate the flow rate of the water in the flow meter so that when the flow rate of the water passing through the flow meter reaches a preset value, the timer stops operating so as to control the water flow exactly and to prevent the water from being supplied excessively or insufficiently.

According to another objective of the present invention, when the water passes through the rotation ring of the flow meter, the rotation ring is rotated, and the magnetic member is moved to pass the detector intermittently to produce a magnetic interaction between the magnetic member and the detector so that the timer can calculate the flow velocity of the water in the flow meter according to the times of the magnetic member passing the detector so as to determine the flow rate of the water in the flow meter according to the flow velocity of the water in the flow meter and the diameter of the flow meter.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
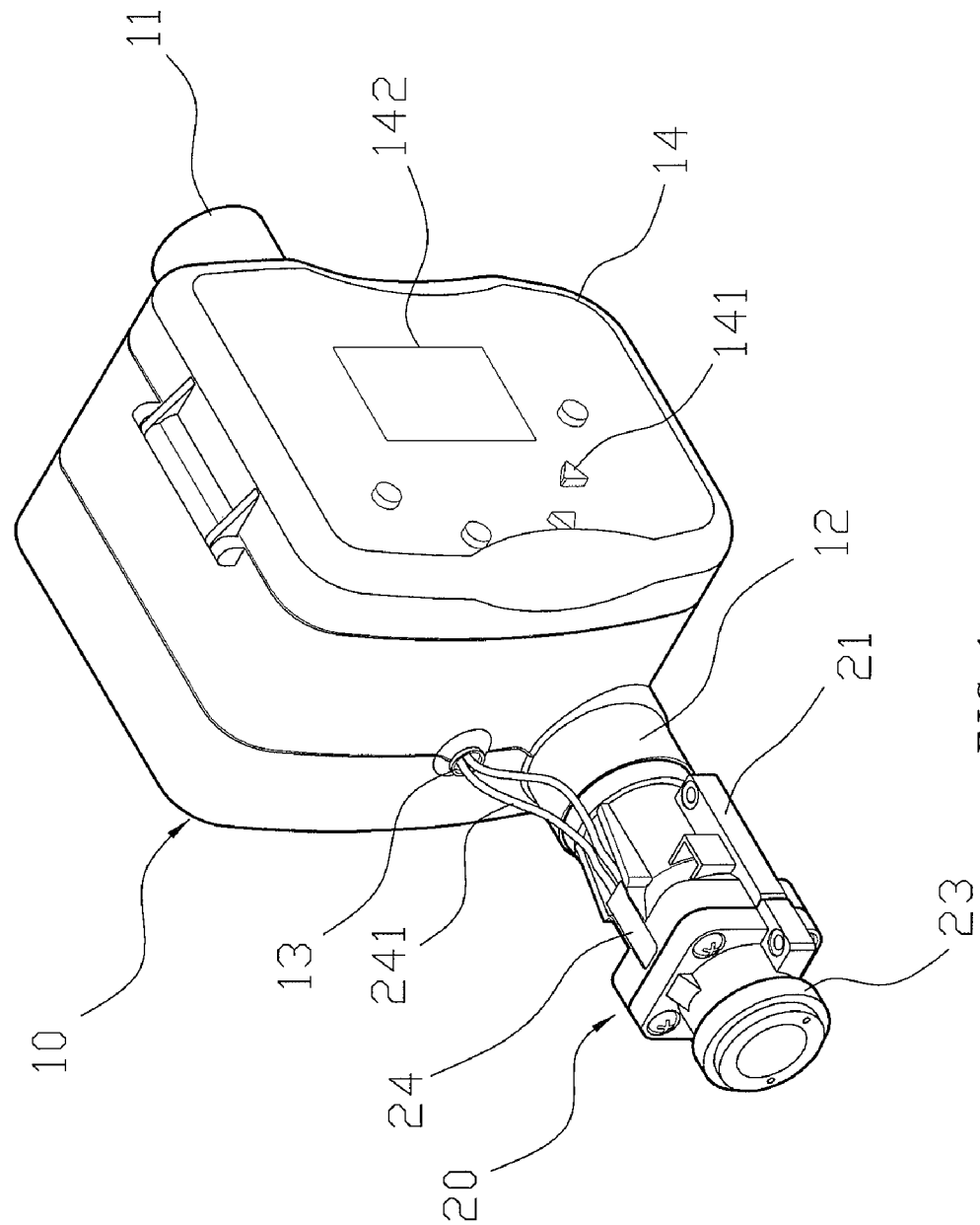
FIG. 1 is a perspective view of a timing device in accordance with the preferred embodiment of the present invention.
Figure 2:
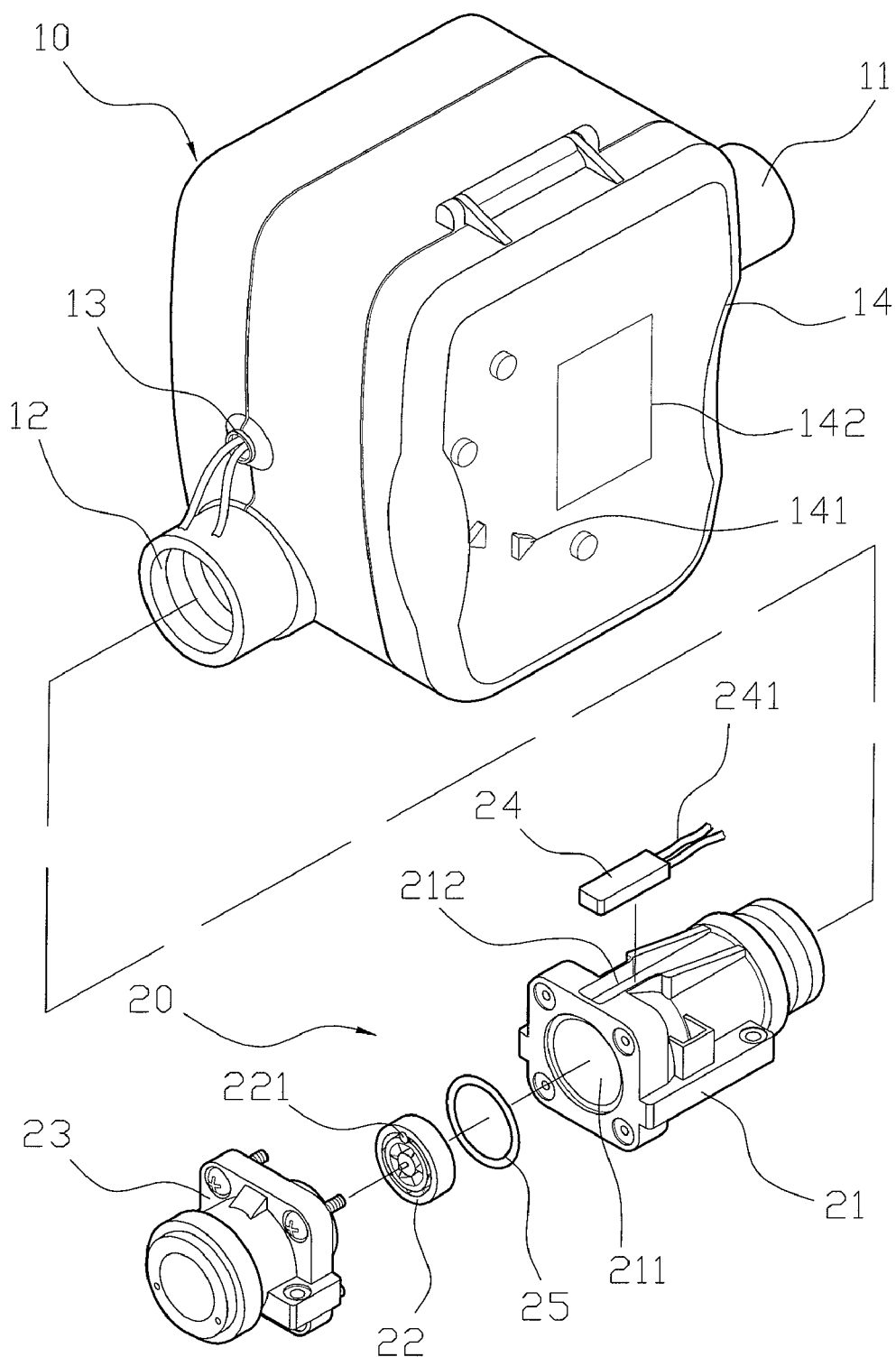
FIG. 2 is an exploded perspective view of the timing device as shown in FIG. 1.
Figure 3:
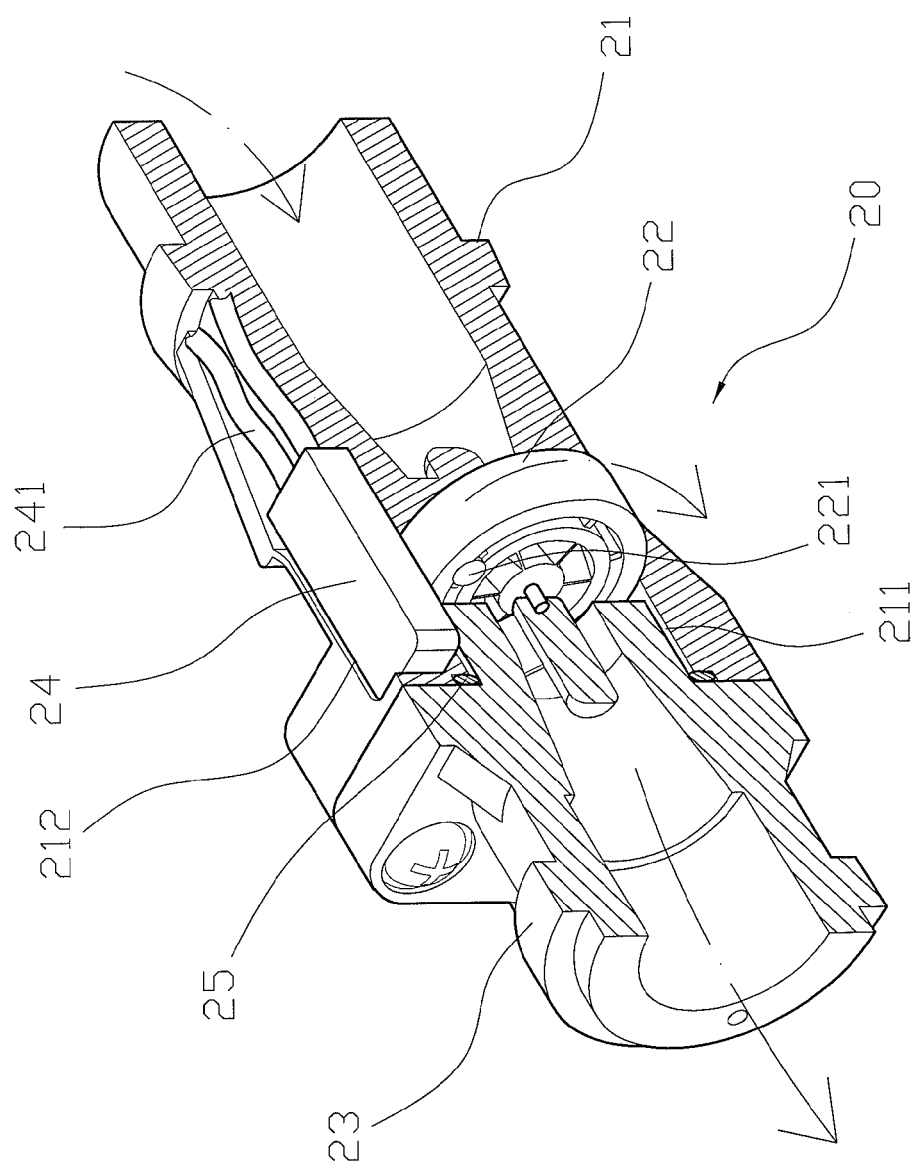
FIG. 3 is a perspective cross-sectional operational view of the timing device as shown in FIG. 1.

Referring to the drawings and initially to FIGS. 1-3, a timing device in accordance with the preferred embodiment of the present invention comprises a timer 10 and a flow meter 20 mounted on the timer 10.

The timer 10 is an electrically controlled flow switch and has a preset on/off time ratio. The timer 10 has a first end provided with a water inlet port 11 and a second end provided with a water outlet port 12 connected to the water inlet port 11. The second end of the timer 10 has a surface provided with a through hole 13 located beside the water outlet port 12.

The flow meter 20 includes a first guide pipe 21 having a first end mounted on the water outlet port 12 of the timer 10 and a second end provided with a mounting chamber 211 connected to the water outlet port 12 of the timer 10, a magnetically controlled detector 24 mounted on an outer wall of the first guide pipe 21, two electric cords 241 electrically connected with the detector 24 and extended through the through hole 13 of the timer 10 into the timer 10 to electrically connect the detector 24 to the timer 10, a rotation ring 22 rotatably mounted in the mounting chamber 211 of the first guide pipe 21 and aligning with the detector 24, a magnetic member 221 mounted on a peripheral wall of the rotation ring 22 to move in concert with the rotation ring 22 and movable to pass the detector 24 intermittently, a second guide pipe 23 mounted on the second end of the first guide pipe 21 and connected to the mounting chamber 211 of the first guide pipe 21, and an O-ring 25 mounted in the mounting chamber 211 of the first guide pipe 21 and located between the first guide pipe 21 and the second guide pipe 23.

The first guide pipe 21 of the flow meter 20 is connected between the water outlet port 12 of the timer 10 and the rotation ring 22 of the flow meter 20. The outer wall of the first guide pipe 21 of the flow meter 20 is provided with a fixing recess 212, and the detector 24 is secured in the fixing recess 212 of the first guide pipe 21. The rotation ring 22 of the flow meter 20 is sandwiched and connected between the first guide pipe 21 and the second guide pipe 23. The second guide pipe 23 of the flow meter 20 is locked onto the mounting chamber 211 of the first guide pipe 21.

The timing device further comprises a lid 14 pivotally mounted on a side of the timer 10, an indication panel 142 mounted on the lid 14 and electrically connected with the timer 10, and a plurality control buttons 141 mounted on the lid 14 and electrically connected with the timer 10 and the indication panel 142 to control the preset on/off time ratio of the timer 10.

Figure 4:
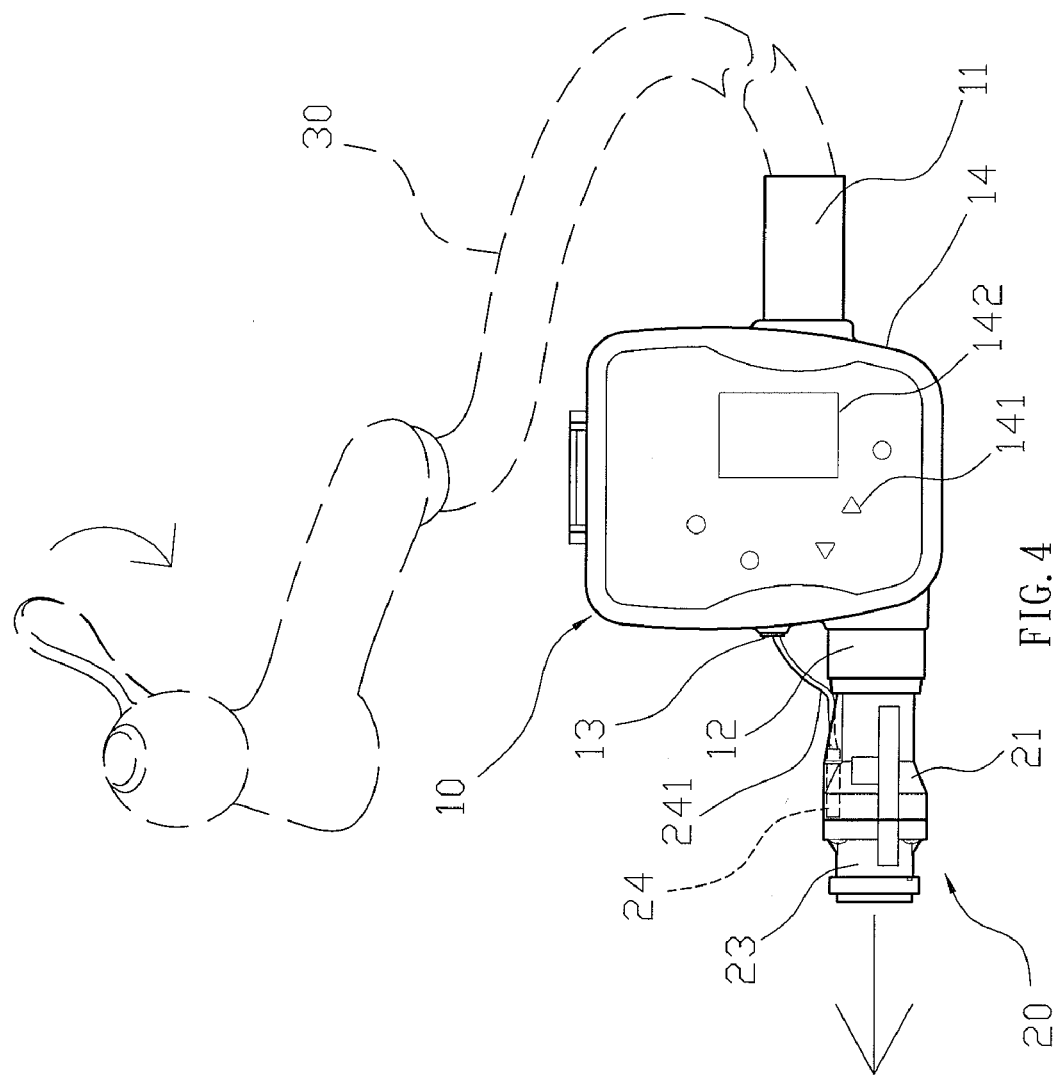
FIG. 4 is a schematic front operational view of the timing device as shown in FIG. 1 in use.

As shown in FIG. 4, the water inlet port 11 of the timer 10 is connected with an inlet pipe 30, and the second guide pipe 23 of the flow meter 20 is connected with an outlet pipe (not shown).

In operation, referring to FIG. 4 with reference to FIGS. 1-3, the user can preset the on/off time of the timer 10 by co-operation of the indication panel 142 and the control buttons 141. Thus, when the timer 10 is operated, water from the inlet pipe 30 can in turn flow through the water inlet port 11 of the timer 10, the inner portion of the timer 10, the water outlet port 12 of the timer 10, the first guide pipe 21 of the flow meter 20, the rotation ring 22 of the flow meter 20 and the second guide pipe 23 of the flow meter 20 into the outlet pipe for use with the user.

When the water passes through the rotation ring 22 of the flow meter 20, the rotation ring 22 of the flow meter 20 is pushed by the water power to rotate relative to the detector 24 so that the magnetic member 221 on the rotation ring 22 is moved to pass the detector 24 intermittently to produce a magnetic interaction between the magnetic member 221 and the detector 24 and to produce a magnetic force between the magnetic member 221 and the detector 24. Thus, the detector 24 detects the times of the magnetic member 221 passing the detector 24 by the magnetic interaction between the magnetic member 221 and the detector 24 and sends a signal to the timer 10 so that the timer 10 can calculate the flow velocity of the water in the flow meter 20 according to the times of the magnetic member 221 passing the detector 24. In such a manner, the timer 10 can determine the flow rate of the water in the flow meter 20 according to the flow velocity of the water in the flow meter 20 and the diameter of the flow meter 20. Thus, when the flow rate of the water passing through the flow meter 20 reaches a preset value, the timer 10 stops operating automatically and instantaneously so as to control the water flow exactly and to prevent consumption of the water.

Accordingly, the timer 10 can calculate the flow rate of the water in the flow meter 20 so that when the flow rate of the water passing through the flow meter 20 reaches a preset value, the timer 10 stops operating so as to control the water flow exactly and to prevent the water from being supplied excessively or insufficiently. In addition, when the water passes through the rotation ring 22 of the flow meter 20, the rotation ring 22 is rotated, and the magnetic member 221 is moved to pass the detector 24 intermittently to produce a magnetic interaction between the magnetic member 221 and the detector 24 so that the timer 10 can calculate the flow velocity of the water in the flow meter 20 according to the times of the magnetic member 221 passing the detector 24 so as to determine the flow rate of the water in the flow meter 20 according to the flow velocity of the water in the flow meter 20 and the diameter of the flow meter 20.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is;

1. A timing device, comprising:
a timer and a flow meter mounted on the timer;
wherein the timer is an electrically controlled flow switch and has a preset on/off time ratio;
the timer has a first end provided with a water inlet port and a second end provided with a water outlet port connected to the water inlet port;
the second end of the timer has a surface provided with a through hole located beside the water outlet port;
the flow meter includes:
a first guide pipe having a first end mounted on the water outlet port of the timer and a second end provided with a mounting chamber connected to the water outlet port of the timer;
a magnetically controlled detector mounted on an outer wall of the first guide pipe;
two electric cords electrically connected with the detector and extended through the through hole of the timer into the timer to electrically connect the detector to the timer;
a rotation ring rotatably mounted in the mounting chamber of the first guide pipe and aligning with the detector;
a magnetic member mounted on a peripheral wall of the rotation ring to move in concert with the rotation ring and movable to pass the detector intermittently; and
a second guide pipe mounted on the second end of the first guide pipe and connected to the mounting chamber of the first guide pipe;
the outer wall of the first guide pipe of the flow meter is provided with a fixing recess;
the detector is secured in the fixing recess of the first guide pipe;
the rotation ring of the flow meter is sandwiched and connected between the first guide pipe and the second guide pipe;
a flow rate of water in the flow meter is calculated according to the times of the magnetic member passing the detector.

2. The timing device of claim 1, further comprising:
a lid pivotally mounted on a side of the timer;
an indication panel mounted on the lid and electrically connected with the timer; and
a plurality of control buttons mounted on the lid and electrically connected with the timer and the indication panel to control the preset on/off time ratio of the timer.

3. The timing device of claim 1, wherein
the flow meter further includes an 0-ring mounted in the mounting chamber of the first guide pipe and located between the first guide pipe and the second guide pipe;
the first guide pipe of the flow meter is connected between the water outlet port of the timer and the rotation ring of the flow meter;
the second guide pipe of the flow meter is locked onto the mounting chamber of the first guide pipe.

* * * * *